United States Patent Office

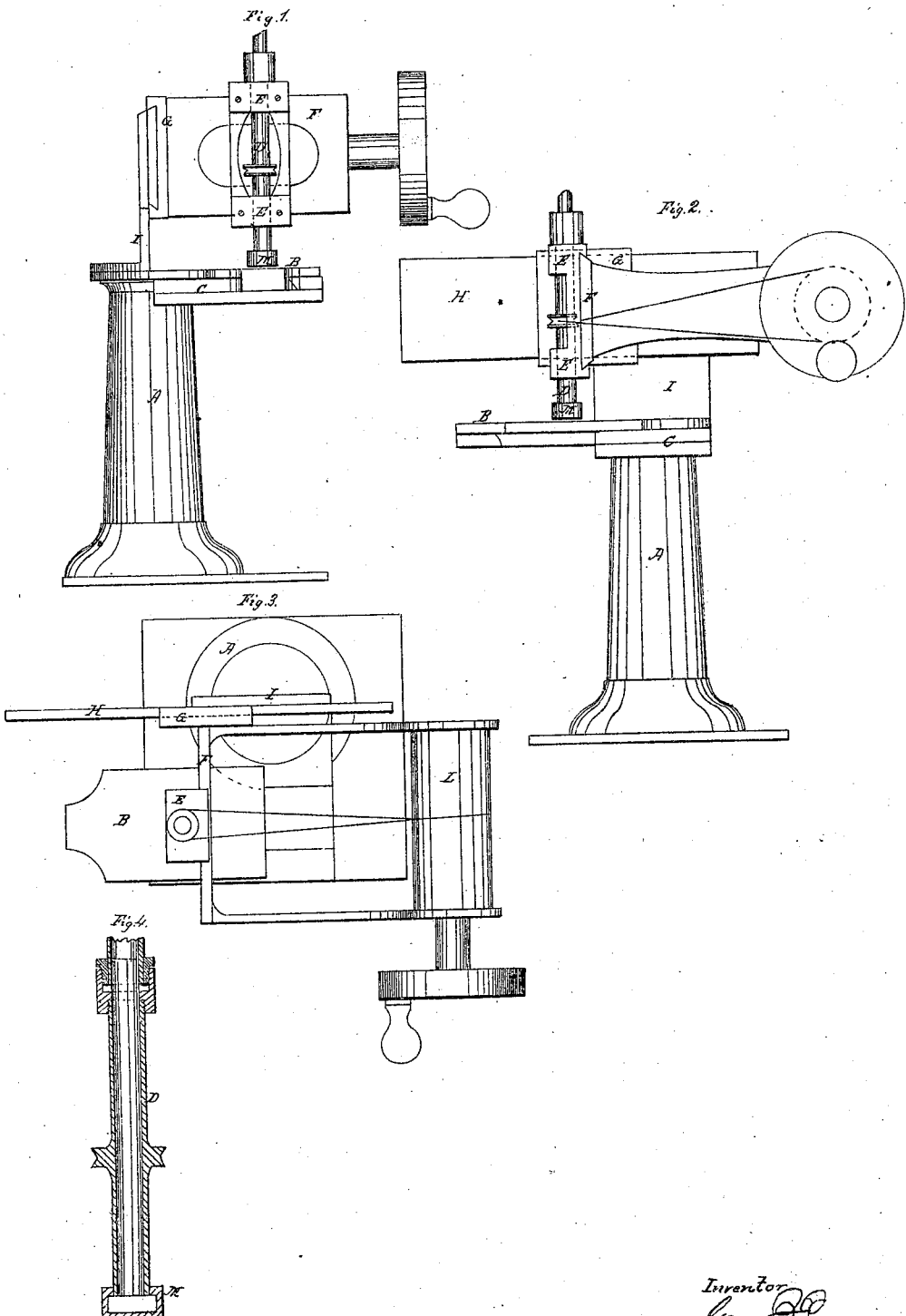

GEORGE B. PERKINS OF BRIDGEPORT, CONNECTICUT.

Letters Patent No. 62,773, dated March 12, 1867.

---

IMPROVEMENT IN IRONING MACHINES.

---

*The Schedule referred to in these Letters Patent and making part of the same.*

---

TO ALL WHOM IT MAY CONCERN:

Be it known that I, GEORGE B. PERKINS, of Bridgeport, in the county of Fairfield, and State of Connecticut, have invented a new Improvement in Ironing Machine; and I do hereby declare the following, when taken in connection with the accompanying drawings, and the letters of reference marked thereon, to be a full, clear, and exact description of the same, and which said drawings constitute part of this specification, and represent, in—

Figure 1, a front end view.
Figure 2, a side view.
Figure 3, a plan or top view; and in
Figure 4, a vertical section, with the ironing spindle enlarged.

My invention is designed more especially for ironing and polishing shirt fronts, but is alike applicable to many other similar uses, and consists in the peculiar manner of heating a rapidly revolving iron, combined with a mechanism for supporting the front while being ironed or polished.

And to enable others skilled in the art to construct and use my improvement, I will proceed to describe the same as illustrated in the accompanying drawings.

A is a base or column, which supports the table and mechanism of my machine. B is the plate or table upon which the "front" is placed. It is arranged upon a plate, C, fixed to the base A, and so as to be moved on the said plate C in proper guides, and in any convenient manner. Over this table, B, a shirt front is placed, and drawn taut by holding the shirt firmly upon the plate C in any convenient manner, and forcing the table B outward, so as to draw the front tight and smooth. This may be done by the arrangement of a screw to operate the plate B, or in any convenient or known manner. D is a spindle, supported in bearings E, so as to revolve freely therein, and, at the same time, to be moved freely up or down. The said bearings, E, are arranged, as seen in figs. 1 and 2, so as to slide freely on a transverse plate, F, projecting from a slide, G, which moves longitudinally on a plate, H; which said plate, H, is supported from the base A by a bracket, I; by which arrangement it will be seen that the spindle D may be moved up and down, to the right or left, or forward and back; and the said spindle is caused to revolve rapidly by a belt from a drum, L, or in other convenient manner. The said spindle is made hollow, its lower end closed by a hollow polishing iron, M, (see fig. 4,) which may be of any convenient or desired form. To the upper end of the said spindle I attach, by means of any known construction of joint, a flexible or jointed tube, through which hot steam is conducted to the polishing iron M, so as to heat the iron to about 275°. This completes the construction of my machine. Its operation is as follows:

The bosom or shirt front being tightly drawn over the plate B, as before described, and the polishing iron heated and caused to revolve rapidly, and resting upon the bosom, it readily adjusts itself to any irregularity in the thickness of the linen, and is, by the operator, moved to and fro, and to the right or left, until the whole front is polished. This work is now done by hand, and requires the most skilful, and, consequently, the most expensive, hands, to perform the labor, which is, at best, a slow and tedious process. By my invention the constantly heated iron greatly facilitates the process of polishing, and enables an ordinary workman to do better work, and in much less time than the same work is now done. If preferred, and in some cases it may be better that the motion of the polishing iron should be more like that of the common iron used, the spindle may be made to revolve partially or quite around and return.

Having, therefore, thus fully described my invention, what I claim as new and useful, and desire to secure by Letters Patent, is—

1. The arrangement of the hollow revolving or rotating heated iron M, in relation to the mechanism described, to permit the movement of the said iron over the surface to be ironed or polished, substantially as herein set forth.

2. In combination with the foregoing I claim the table B, constructed and arranged so as to draw the front smoothly thereon, substantially as herein described.

GEO. B. PERKINS.

Witnesses:
EDWARD LYMAN,
JOSHUA LORD.